Dec. 24, 1929.  W. F. STANTON  1,740,790
GAS ENGINE
Original Filed Jan. 10, 1919   4 Sheets-Sheet 1
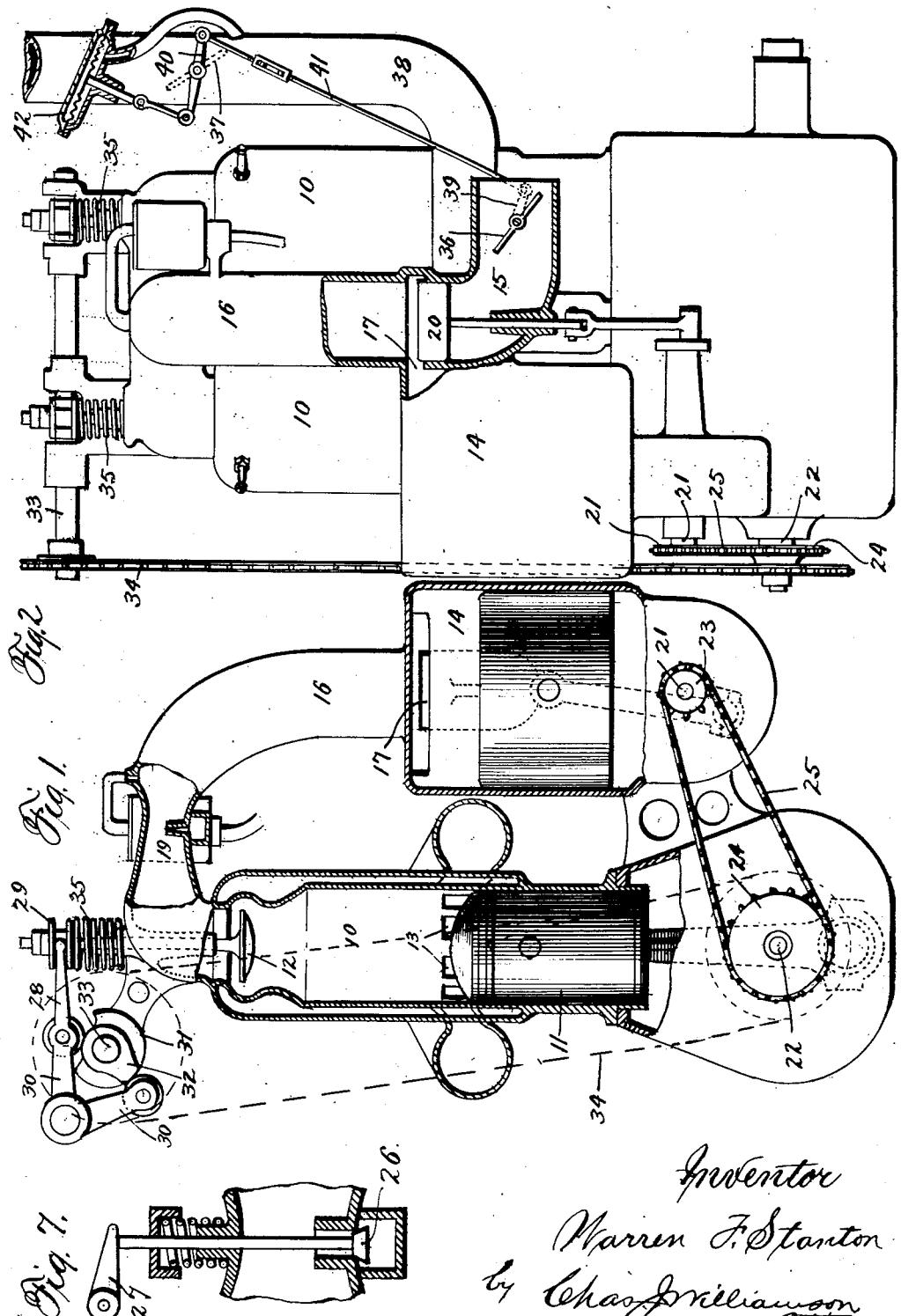
Inventor
Warren F. Stanton
by Chas. J. Williamson
atty Dec. 24, 1929.  W. F. STANTON  1,740,790
GAS ENGINE
Original Filed Jan. 10, 1919  4 Sheets-Sheet 2

Inventor
Warren F. Stanton.
by Chas. J. Williamson
Attorney

Dec. 24, 1929.          W. F. STANTON          1,740,790
                           GAS ENGINE
            Original Filed Jan. 10, 1919    4 Sheets-Sheet 3

Inventor
Warren F. Stanton
by Chas J Williamson
          Atty

Dec. 24, 1929.  W. F. STANTON  1,740,790
GAS ENGINE
Original Filed Jan. 10, 1919  4 Sheets-Sheet 4
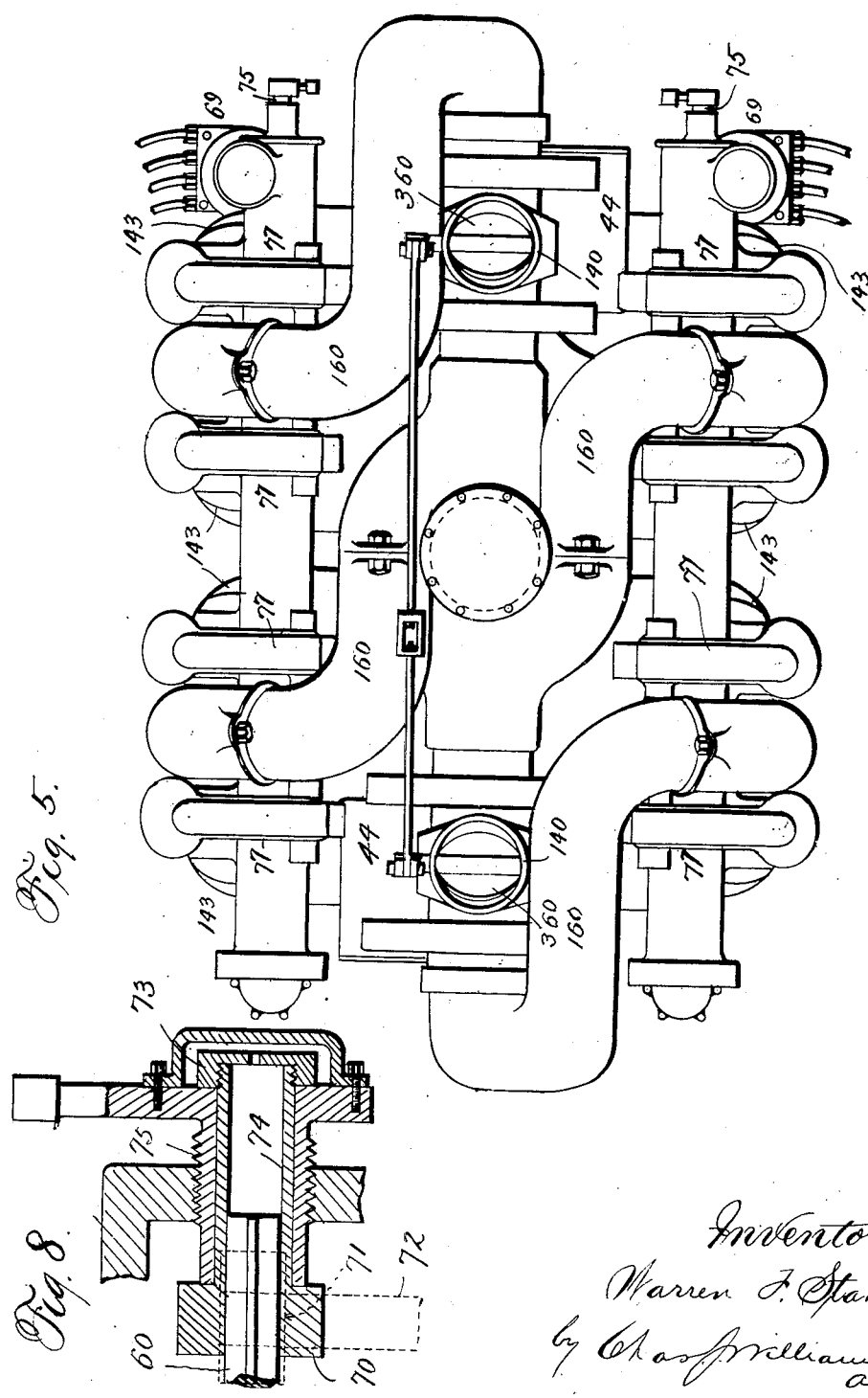

Patented Dec. 24, 1929

1,740,790

UNITED STATES PATENT OFFICE

WARREN F. STANTON, OF PAWTUCKET, RHODE ISLAND

GAS ENGINE

Application filed January 10, 1919, Serial No. 270,558. Renewed May 1, 1926.

Stated in general terms, the object of my invention is to provide a satisfactory high-speed, two cycle internal combustion engine of high power for its weight, economical of fuel, reliable in operation, compact in structure, and susceptible to arrangement in all the forms common to four cycle engines. Another important object is to render the engine in so far as the density of its charge is concerned, independent of variation in barometric pressure consequent upon its operation at different altitudes, as in airplane service; and yet another purpose is the variable timing of air or fuel, or both, according to the requirements of the engine. For the attainment of these objects, and to secure other advantages which will be appreciated by those skilled in the art when the nature of the invention is disclosed my invention consists in the engine having the characteristics of construction substantially as hereinafter specified and claimed.

I have selected for the purpose of disclosing my invention, two different embodiments thereof, but such embodiments are merely illustrative and not restrictive, since my invention may exist in other forms. In the annexed drawings:—

Figs. 1 and 2, are, respectively, a vertical cross section, and a side elevation, partly in section of one embodiment of my invention;

Fig. 5, is a top plan view thereof;

Fig. 7 is a detail view of a form of valve mechanism for controlling the fuel supply.

Fig. 8 is a detail view of the means that may be used for varying the time of fuel delivery.

Figure 3:
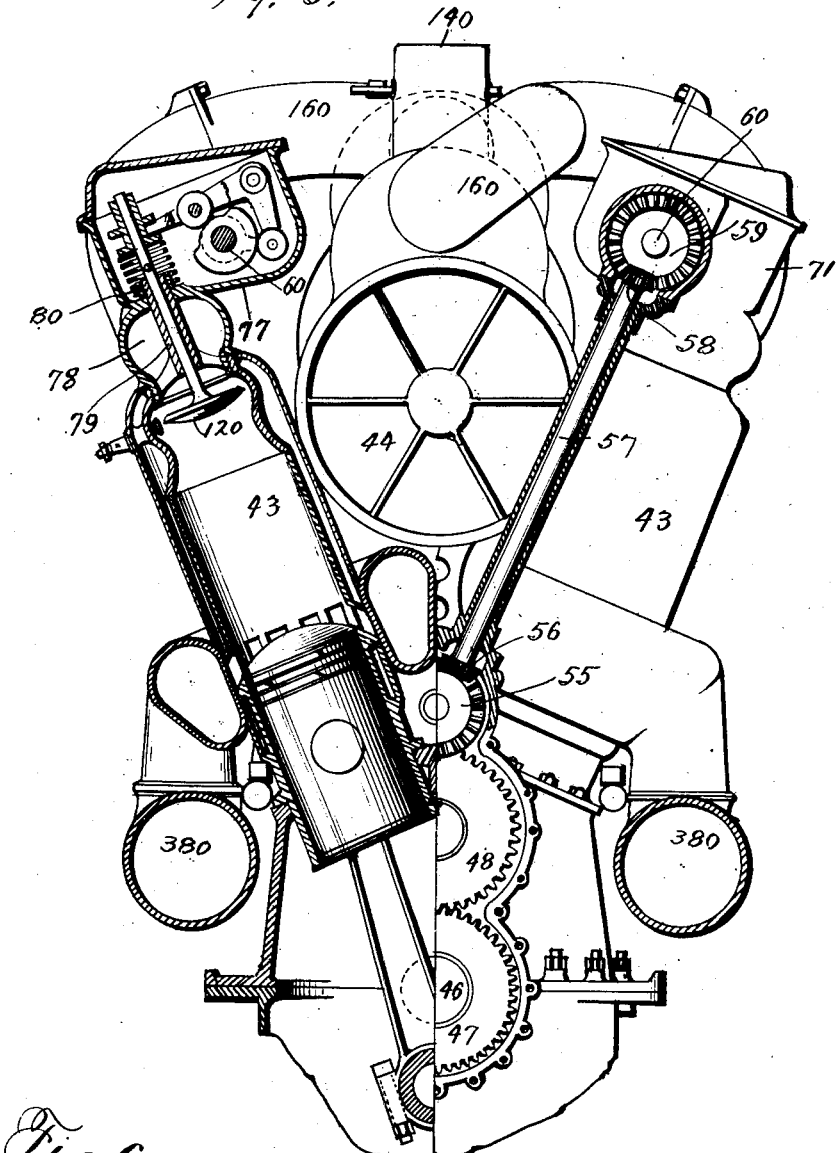
Figs. 3 and 4, are respectively, like views of another embodiment.
Figure 6:
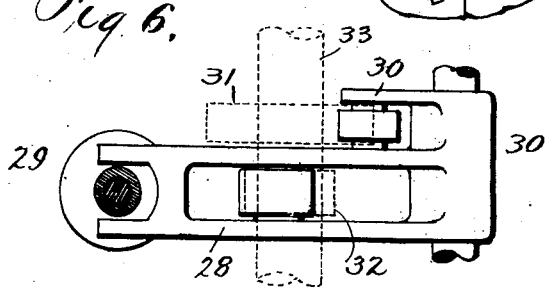
Fig. 6 is a detail plan view of the inlet valve operating mechanism.

Describing first, the form of my invention appearing in Figs. 1 and 2, which is a two cylinder engine, the cylinders which are vertical; are designated 10, the pistons 11, the inlet valve 12, and the exhaust ports 13, the single air compressor or pump which serves for both engine cylinders, is designated 14, the air pump intake 15, and its outlet or discharge 16, the latter leading from the port 17 in the form of a pipe to the ports at the top of both engine cylinders which are controlled by the inlet valves 12. Fuel is supplied into the pipe 16 through an inlet or nozzle 19 and thereby the gas and air mixture is provided. The air pump shown is single acting and as having a piston valve 20 that controls the port 17. The crank shaft 21 of the air pump, is geared to the engine crank shaft 22, so that the air pump piston moves faster than the engine pistons, and preferably two or three times as fast, so that the delivery of the charge of air to the cylinder may take place while the exhaust port and inlet valve are open, this being accomplished because the exhaust port and inlet are open for a period not less than the duration of the delivery stroke of the pump; the exhaust port being open for about 120 degrees, and the inlet port for about 105 degrees of the revolution of the engine crank shaft, whereas the delivery stroke of the pump piston is 90 degrees, or less. By thus running the pump, compactness and lightness are secured, since the greater speed or increase of strokes over the engine pistons makes up for the larger volume or bulk of a slow-moving piston. The gearing shown consists of two-to-one sprocket wheels 23 and 24 on the respective shafts and sprocket chain 25. The displacement of the air pump piston is greater than that of each engine piston, and preferably twice, or thrice as great, per piston stroke.

It will be seen that by timing the delivery stroke of the pump piston to begin not before the opening of the inlet valve and, of course, after the opening of the exhaust port of the engine, the only work required of the pump piston is in delivering a scavenging charge of air to the engine cylinder, is that of moving the body of air, and thus no energy is needlessly expended in any appreciable precompression of a scavenging charge of air. While the scavenging is being done, and until the exhaust port is nearly closed, no fuel need be admitted to the air delivering pipe from the air pump, a suitably timed, automatically controlled fuel valve being provided for this purpose, and, as at the time the fuel is supplied to the stream of air, the inlet port is already open, I secure the same advantage of no unnecessary load on the air pump piston. I also secure the further important advantage from the fact that practically the same pressures exist on both sides of the inlet valve when the flow of air, or the mixture begins, that there is no danger (such as exists when the air is pre-compressed) of a stream of air or mixture flowing past the inlet valve at high velocity, creating an objectionable turbulence, and cutting through the residual gases instead of driving them onward and out of the exhaust port, and thus rendering the scavenging ineffective and wasting the mixture. Until the inlet port is fully open, the flow is relatively slow, so that a large body of air or mixture filling the cylinder from side to side flows therethrough without turbulence, and not shearing through the spent gases, so to speak. Again, the ignitable mixture remains near the head of the cylinder, when a small amount is admitted, and this results in the motor running well on light loads and permits stratification to take place in the cylinder. To augment these advantages, I shape the inside surface of the cylinder head accordingly, and control the fuel flow, as by using a carburetor with a throttle control, or a timed valve, or a fuel pump timed to deliver fuel towards the end of the scavenging flow from the air pump. As shown in Fig. 1 the fuel nozzle is always open so that whenever air flows past it, fuel is drawn therefrom. In Fig. 7, an automatic valve mechanism is shown, consisting of a spring-seated valve 26 in the nozzle, and a cam-actuated lever 27 that unseats the valve at the desired time and for the desired period. Obviously the fuel supply may be taken care of and controlled in numerous ways.

I open and close the inlet valve positively, by a lever 28 that at one end engages a spool or double-flanged collar 29 on the valve stem, and which has two arms 30 that are respectively engaged at the diametrically opposite sides of two cams 31 and 32 so as to be alternately moved in opposite directions. The cams are on a rotating shaft 33, that is connected as by sprocket gearing 34, to the engine crank shaft, to rotate at the same speed as the latter. The valve is held to its seat by a spring 35, which however, is relatively weak because it does not have to start the valve to its seat, for that is done positively by the cam 31. But a limited angular portion of the cam 31 need have contact with the lever arm because during the first half of the valve movement or opening, and the last half on closing the momentum of the valve and lever holds the lever arm in contact with the cam 32. Thus, breakage of parts from inaccurate adjustment of lever and cams is avoided.

To render the charge supplied to the engine of uniform density, regardless of variation in barometric pressure, at different altitudes, and thus render the engine power constant at all altitudes, I provide means for varying the density according to the altitude, by varying the volume of air entering and acted on by the air pump. For this purpose, I place a throttle valve 36 in the pump air intake, and a throttle valve 37 in the engine exhaust 38, and connect crank arms 39 and 40, thereof, by a link or rod 41, so that as one opens, the other closes. Thus the influx and efflux of air is controlled and its density rendered constant, or substantially constant. This control may be manual or automatic. To make it automatic, I provide an aneroid, or sealed expansive cell 42, the air being sealed therein at atmospheric pressure, and its diaphragm being connected with one of the throttle valve cranks. Thus, when the external atmospheric pressure reduces, the diaphragm is moved outward by the expansion of the volume of sealed air, and closes more or less the exhaust throttle valve, and opens more or less the air pump intake throttle valve; and upon increase of the external atmospheric pressure, the opposite action takes place.

Figure 4:
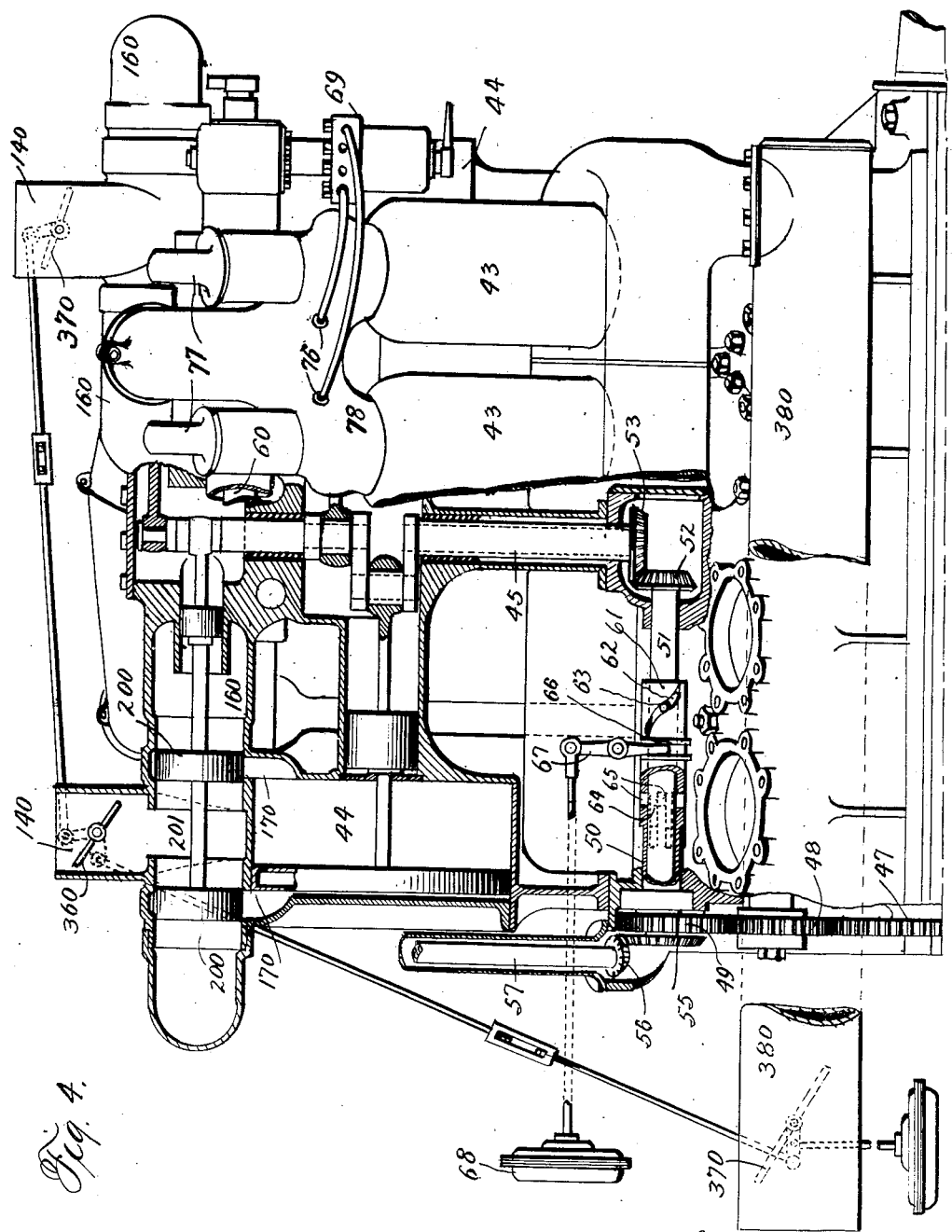

*Description of engine of Figs. 3, 4, and 5.—* This egine is of the V-type, and I utilize the V-space between the diverging engine cylinders 43 to install the air pump 44, which is placed with its axis horizontal, and its crank shaft 45 vertical. The construction, as to engine cylinder, inlet valve 120, and valve operating mechanism is the same as in Figs. 1 and 2, and, therefore, need not be further described; and this is also the case as to the air pump intake 140, its throttle valve 360, and throttle valve 370 in the exhaust 380 to control the density of the charge at varying altitudes.

For driving the air pump from the engine crank shaft 46, the latter has a spur gear 47 which meshes with an idler 48 that in turn meshes with a spur gear 49 on a tubular horizontal shaft 50. Passing through the latter is a shaft 51, on one end of which is a bevel gear 52 that meshes with a like gear 53 on the air pump crank shaft 45, and thereby power may be delivered to the latter to reciprocate its double acting piston, and its piston valves. On the other end of the shaft 51 is a bevel gear 55 with which meshes two bevel pinions 56 on the lower end of two shafts 57, respectively, that at their upper ends have each, a bevel pinion 58 that meshes with a bevel gear 59 on the shaft 60 of the inlet valve-operating mechanism. Longitudinally slidable on the shaft 51 is a sleeve 61 having a spiral slot 62 that is engaged by a pin or stud 63 on the shaft 51, so that by moving the sleeve longitudinally while its relative rotation is prevented, the shaft 51 may be rotated, and thus the various parts receiving motion from said shaft 51 may be moved and thus the timing of the air and fuel supply and inlet valve opening varied. The sleeve 61 at one end has fingers 64 that interlock with fingers 65 fixed to the tubular shaft 50, so that at all points in its longitudinal motion, the sleeve will be rotatably engaged with the tubular shaft, and transmit the rotary motion of the latter to the shaft 51. For moving the sleeve 61 longitudinally, it has an annular groove 66 engaged by a forked lever 67 which has suitable means for rocking it, preferably, automatically by an aneroid 68, so as to delay a portion of the air until the exhaust ports close. The fuel is supplied from pumps 69 arranged in two sets, one for each row of cylinders, and said pumps are driven by spiral gears 70 from the cam shafts 60, the gears 70 on the cam shaft being splined thereto, and shiftable at will along the same to thereby turn its mating gear 71 on the shaft 72 to change the time of delivery of fuel into the air flow from the air pump. For shifting it I mount on a threaded sleeve 74 on the gear, a screw 75, screwed in the casing, and confined between the gear at one end and a nut 73 at the other end. See Fig. 8. As the pump construction forms no part of the present invention, I do not show the same. The fuel is sprayed at 76 just above the intake valve so that the spray head is not subjected to heat and pressure of the cylinder proper.

It will be seen that by timing the air pump with reference to the closing of the exhaust ports, which the shifting of the sleeve 61 by changing barometric pressure effects, results in maintenance of a uniform, or substantially uniform density of air delivered to the cylinders, and while I show the engine provided with both that device and the throttle control device, it is to be understood that but one need be provided. When both are provided, both may be in actual operative condition, or one may be placed out of operation and when only the variable timing device is provided, the exhaust throttle may be discarded.

In both forms of engine illustrated, the diaphragm of the aneroid is shown as acting directly to move the throttle valves, but in practice it is desirable to have a motor of some sort that will actuate the throttle valves, which is controlled by the motion of the diaphragm. Of course, the density of the charge may be made any degree desired.

A feature of construction of practical value is embodied in the V-engine, in that the inlet valve-operating mechanism is enclosed in a housing 77 and the latter, to secure lightness and strength, is cast in one piece with the inlet manifold 78. In the assembly of the parts the inlet valve stem guide 79, connected with the cylinder, passes through a hole in the housing wall, and is threaded outside the latter to receive a nut or nuts 80 to clamp the housing and manifold to the cylinder, the construction thus being a most simple one.

The air compressors 44 are double-acting, and piston valves 200 control the admission and discharge of air through ports 170, the compressed air being led from the valve cylinder 201 by pipes 160 to the engine cylinders 43. In the engine shown there are two air compressors.

I claim:—

1. An internal combustion engine having an air pump and means to vary the volume of air passing through the pump inversely to the barometric pressure of the atmosphere comprising simultaneously but reversely acting inlet and exhaust controlling means.

2. An internal combustion engine having an air pump and automatic means to vary the volume of air passing through the pump inversely to the barometric pressure of the atmosphere comprising simultaneously but reversely acting inlet and exhaust controlling means.

3. An internal combustion two-cycle engine having an air pump and automatic means to vary the volume of air passing through the pump inversely to the barometric pressure of the atmosphere comprising simultaneously but reversely acting inlet and exhaust controlling means.

4. In a gas engine, the combination of an air compressor, an inlet valve for the fuel, and means acting to change the timing of air compressor and valve simultaneously.

5. In a gas engine, the combination of an air compressor, an inlet valve for the fuel, and automatic means acting to change the timing of air compressor and valve simultaneously.

6. In a gas engine, the combination of an air compressor, an inlet valve for the fuel, and automatic means acting to change the timing of air compressor and valve simultaneously upon changes in barometric pressure.

7. In a gas engine, the combination of an air compressor, an inlet valve, a common operating means for air compressor and valve, and means acting on said operating means to change the timing of the air compressor and the valve.

8. In a gas engine the combination of an air compressor, an inlet valve for the fuel, a fuel pump, and means acting to change the timing of all said elements simultaneously.

9. In a gas engine the combination of an air compressor, an inlet valve for the fuel, a fuel pump, and means acting under changes in barometric pressure to change the timing of all said elements simultaneously.

10. In a gas engine, the combination of a cylinder, an inlet valve, operating mechanism for the valve, a manifold, a casing for the valve operating mechanism integral with the manifold, and means to secure such casing to the cylinder, comprising a valve stem guide passing through a hole in the casing and a nut on a protruding portion of the guide.

11. An internal combustion engine having a cylinder and piston and inlet and exhaust ports, an air pump having a piston, and means for moving the pump piston thru more strokes than the engine piston moves in a given period, the opening of the engine exhaust and inlet being timed to start the delivery of air to the engine cylinder while the exhaust and inlet are open.

12. The combination in a two-cycle engine having a carbureter, a throttle to control the carbureter mixture and an exhaust passage, of a throttle for said passage and means for operating said throttles in predetermined relation.

13. The combination in a two-cycle engine having an igniter and a mixture inlet at one end of the combustion chamber and an exhaust outlet at the other, of means for retaining variable amounts of exhaust gas within the chamber, said means being operated in predetermined relation to the admission of mixture through said inlet.

14. In a two-cycle engine the combination of means for compressing and delivering charge mixture to the combustion chamber and control means therefor adapted to reduce the supply and coincidently the pressure of the delivered mixture, means associated with the exhaust from said chamber adapted to maintain a greater pressure therein during such entry of such reduced mixture supply than during the entry of a larger supply.

In testimony that I claim the foregoing I have hereunto set my hand.

WARREN F. STANTON.